(12) United States Patent
Boesch et al.

(10) Patent No.: US 10,843,646 B2
(45) Date of Patent: Nov. 24, 2020

(54) VEHICLE POWER SUPPLY WITH LOAD SHED INTERLOCK

(71) Applicant: Ford Global Technologies, LLC, Dearborn, MI (US)

(72) Inventors: Mathew Alan Boesch, Plymouth, MI (US); Sami Dagher, Dearborn, MI (US); David Celinske, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 16/032,530

(22) Filed: Jul. 11, 2018

(65) Prior Publication Data

US 2020/0017042 A1    Jan. 16, 2020

(51) Int. Cl.
| H02J 1/10 | (2006.01) |
| B60R 16/033 | (2006.01) |
| B60R 16/023 | (2006.01) |
| B60L 58/10 | (2019.01) |

(52) U.S. Cl.
CPC ............ *B60R 16/033* (2013.01); *B60L 58/10* (2019.02); *B60R 16/0232* (2013.01); *B60L 2210/10* (2013.01); *B60L 2260/32* (2013.01)

(58) Field of Classification Search
CPC ....................................................... B60R 16/03
USPC ..................................................... 307/9.1, 29
See application file for complete search history.

(56) References Cited

U.S. PATENT DOCUMENTS

| 5,267,135 A | 11/1993 | Tezuka et al. |
| 6,614,671 B2 | 9/2003 | Thrap |
| 7,235,898 B1 | 6/2007 | Jones, III et al. |
| 7,627,774 B2 | 12/2009 | Egan et al. |
| 2005/0029867 A1* | 2/2005 | Wood ................. H02J 1/14 307/10.1 |
| 2011/0019323 A1* | 1/2011 | Ohshima ........... H03K 17/082 361/93.1 |
| 2015/0035358 A1 | 2/2015 | Linkhart et al. |

FOREIGN PATENT DOCUMENTS

CN          203157726 U       8/2013

* cited by examiner

*Primary Examiner* — Rexford N Barnie
*Assistant Examiner* — Dru Parries
(74) *Attorney, Agent, or Firm* — Frank A. MacKenzie; Bejin Bieneman PLC

(57) ABSTRACT

A vehicle power management system includes a primary power bus for powering a first non-critical load, a secondary power bus for powering a second non-critical load, and a first relay electrically connected between the primary power bus and the first non-critical load. The vehicle power management system further includes a second relay electrically connected between the secondary power bus and the second non-critical load. The first inductor is electrically connected to the secondary power bus and the second inductor is electrically connected to the primary power bus.

20 Claims, 4 Drawing Sheets

US 10,843,646 B2

VEHICLE POWER SUPPLY WITH LOAD SHED INTERLOCK

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Figure 1:
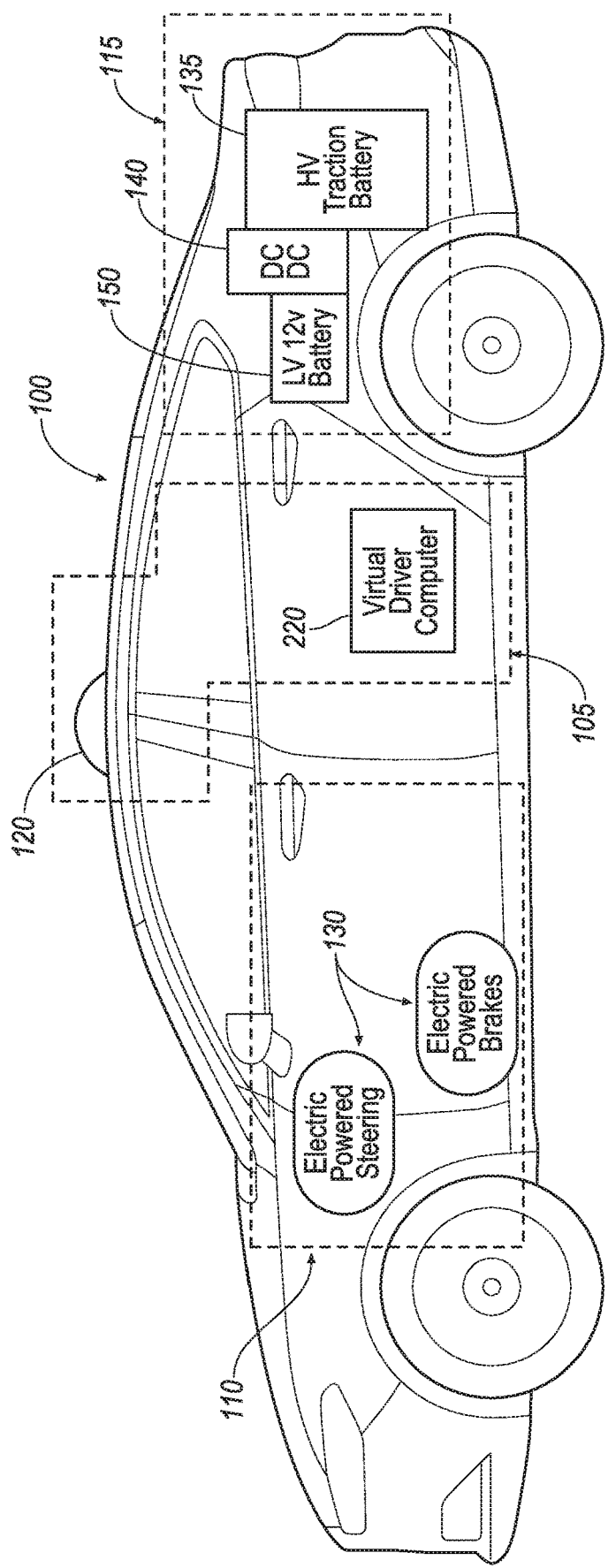
FIG. 1 illustrates an example vehicle with a power management system.

Certain systems require continuous power, especially when no manually powered backup system is available. Examples of systems needing continuous power include life support systems, medical systems, aircraft control systems, certain vehicle control systems, and various alarm systems such as fire, smoke, and noxious gas detection systems. In the automotive context, an autonomous vehicle, while in motion, benefits from continuously powering the steering and braking actuators since a driver may not be available to manually operate the steering wheel and brakes.

Continuous power supplies are designed to be robust to various types of faults. Adding redundancy, which could include using two or more isolated power supply busses, is one way to improve robustness. Backup energy storage systems, such as backup batteries, can provide redundancy to larger energy storage or continuously generating systems for a period of time dictated by the installed storage capacity and the actual loads applied. When critical controls (sometimes referred to as "system critical loads") share stored power with non-critical loads and the energy storage system is unable to fully power both the critical and non-critical loads, shedding the non-critical loads can make more power available to the system critical loads for a longer period of time. Shedding loads can involve sending a network shed request to the non-critical loads commanding the non-critical load to deactivate. Alternatively or in addition, the non-critical load can be disconnected from the energy storage system by, e.g., opening a relay if the non-critical load does not or cannot execute a shed request. Another issue arises when the critical loads, non-critical loads, and backup battery are arranged in parallel in a circuit. In that instance, certain failures of the non-critical load can cause the backup battery to short to ground, taking electrical energy away from the critical loads 130.

In redundant systems, a fault of one power supply, e.g., an electrical short circuit, can disable that faulty power supply. After the faulty power supply has been disabled, a redundant power supply may power system critical loads 130. The non-critical loads may be shed to maximize the amount of power available to the critical loads 130. Load shedding may occur when a vehicle computer outputs a signal to the non-critical loads requesting the load shed. A time delay occurs between the time the vehicle computer determines that the non-critical load should be shed and the time the non-critical load is able to act upon the signal output by the vehicle computer. During that time delay, the non-critical load could overload the redundant power supply, resulting in an immediate loss of power available to the critical loads 130.

One solution involves an interlock circuit arranged to supply power to non-critical loads while two or more power supplies are in operation. Failure of either power supply could passively result in an immediate shed of the non-critical loads. For example, a first power storage may deliver energy to a first group of non-critical loads that are in series with a switching device, e.g., a mechanical or solid state relay, controlled by a second power storage. If the second power storage is not operational, the primary power supply will not deliver power to the first group of non-critical loads. Conversely, the second power storage delivers energy to a second group of non-critical loads that are in series with a switching device controlled by the first power storage. If the first power storage is not operational, the second power storage will not power the second group of non-critical loads. Furthermore, a vehicle computer can separately control the states (e.g., on or off) of the relay switching devices to allow for a controlled power-up of non-critical loads after, e.g., the vehicle computer has completed certain health checks. It also or alternatively allows the vehicle computer to actively shed the non-critical loads in response to power supply faults that bound the amount of energy available even in the absence of a complete power supply failure.

Passively shedding non-critical loads upon the failure of one of the power supplies reduces the time delay between the vehicle computer detecting the failure and outputting a control signal to actively separate the non-critical load from the remaining power supplies. Eliminating the time delay removes the window in time when a fault on the non-critical load could otherwise overload the remaining operational power supply to minimize the risk of an immediate and total loss of electrical power. Also, during the start-up phase, the non-critical loads may remain unpowered or otherwise non-operational at least until the vehicle computer confirms that both power supplies are in good health. The vehicle computer may further inhibit vehicle motion (e.g., keep the vehicle from operating in an autonomous, partially autonomous, or non-autonomous mode) at least until the vehicle computer confirms that the power supplies are working properly.

An example vehicle power management system includes a primary power bus for powering a first non-critical load, a secondary power bus for powering a second non-critical load, a first relay electrically connected between the primary power bus and the first non-critical load, and a second relay electrically connected between the secondary power bus and the second non-critical load. The first inductor is electrically connected to the secondary power bus and the second inductor is electrically connected to the primary power bus.

The vehicle power management system may further include a first voltage converter electrically connected to the primary power bus. In that approach, the vehicle power management system may further include a second voltage converter electrically connected to the secondary power bus.

The vehicle power management system may further include a first power storage electrically connected to the primary power bus. In that approach, the vehicle power management system may further include a second power storage electrically connected to the secondary power bus.

The vehicle power management system may further include a processor, and the first relay may include a first switch and a first inductor and the second relay may include a second switch and a second inductor. The processor may be programmed to control a state of the first switch and a state of the second switch. Further, the processor may be programmed to control the state of the first switch by outputting a signal to a first transistor electrically connected in series with the first inductor to control current flow through the first inductor. In that implementation, the processor may be further programmed to control the state of the second switch by outputting a signal to a second transistor electrically connected in series with the second inductor to control current flow through the second inductor. In some instances, the processor may be programmed to detect a vehicle startup and open the first relay and the second relay as a result of detecting the vehicle startup. In that implementation, opening the first relay may include outputting a signal to a first transistor in series with the first inductor to open the first switch. Further, opening the second relay may include outputting a signal to a second transistor in series with the second inductor to open the second switch. Moreover, the processor may be programmed to detect that at least one of a high voltage power source, a first voltage converter, a second voltage converter, a first power storage, and a second power storage is working properly. In that instance, the processor may be programmed to detect that at least one of the high voltage power source, the first voltage converter, the second voltage converter, the first power storage, and the second power storage is working properly based at least in part on a signal output by a battery controller. Also in that instance, the processor may be programmed to close the first relay and the second relay as a result of detecting that the high voltage power source, the first voltage converter, the second voltage converter, the first power storage, and the second power storage are working properly.

Another example vehicle power management system includes a primary power bus for powering a first non-critical load, a secondary power bus for powering a second non-critical load, a first voltage converter electrically connected to the primary power bus, a second voltage converter electrically connected to the secondary power bus, a first power storage electrically connected to the primary power bus, a second power storage electrically connected to the secondary power bus, a first relay, and a second relay. The first relay is electrically connected between the primary power bus and the first non-critical load. The first relay has a first switch and a first inductor. The second relay is electrically connected between the secondary power bus and the second non-critical load. The second relay has a second switch and a second inductor. The vehicle power management system further includes a processor programmed to control a state of the first switch and a state of the second switch. The first inductor is electrically connected to the secondary power bus and the second inductor is electrically connected to the primary power bus.

In that implementation, the processor may be programmed to control the state of the first switch by outputting a signal to a first transistor electrically connected in series with the first inductor to prevent current flow through the first inductor. Further, the processor may be programmed to control the state of the second switch by outputting a signal to a second transistor electrically connected in series with the second inductor to prevent current flow through the second inductor.

In some instances, the processor may be programmed to detect a vehicle startup and open the first relay and the second relay as a result of detecting the vehicle startup. In that approach, opening the first relay may include outputting a signal to a first transistor in series with the first inductor to open the first switch. Further, opening the second relay may include outputting a signal to a second transistor in series with the second inductor to open the second switch. Moreover, the processor may be programmed to detect that at least one of a high voltage power source, a first voltage converter, a second voltage converter, a first power storage, and a second power storage is working properly based at least in part on a signal output by a battery controller. The processor may be further programmed to close the first relay and the second relay as a result of detecting that the high voltage power source, the first voltage converter, the second voltage converter, the first power storage, and the second power storage are working properly.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, the autonomous host vehicle 100 includes a virtual driver system 105, an automated vehicle platform ("AVP") 110, and a power management system 115. At least some parts of the virtual driver system 105, the power management system 115, or both, may be implemented by a vehicle computer.

The virtual driver system 105 is a computing platform, implemented via sensors 120, controllers, circuits, chips, and other electronic components, that control various autonomous operations of the host vehicle 100. The virtual driver system 105 includes an autonomous vehicle controller 220 programmed to process the data captured by the sensors 120, which may include a lidar sensor, a radar sensor, a camera, ultrasonic sensors, etc. The autonomous vehicle controller 220 is programmed to output control signals to components of the automated vehicle platform 110 to autonomously control the host vehicle 100 according to the data captured by the sensors 120.

The automated vehicle platform 110 refers to the components that carry out the autonomous vehicle operation upon instruction from the virtual driver system 105, and specifically, from the autonomous vehicle controller. As such, the automated vehicle platform 110 includes various actuators incorporated into the host vehicle 100 that control the steering, propulsion, and braking of the host vehicle 100. The automated vehicle platform 110 further includes various platform controllers (sometimes referred to in the art as "modules"), such as a chassis controller, a powertrain controller, a body controller, an electrical controller, etc.

The power management system 115, described in greater detail below, passively isolates an operating power supply from non-critical loads 125 should another power supply fail. In doing so, the power management system 115 prevents the non-critical loads 125 from draining the energy of the operating power supply, which allows the operating power supply to continue to power critical loads 130 during operation of the host vehicle 100. The power management system 115 is described in more detail below with respect to FIG. 2. As shown in FIG. 1, components of the power management system 115 include a high voltage power source 135, voltage converters 140 (discussed below with reference to FIG. 2), and power storage 145 (discussed below with reference to FIG. 2). Example critical loads 130 are also shown in FIG. 1 and described in greater detail below with respect to FIG. 2.

The high voltage power source 135 is a high voltage battery or high voltage generator in the host vehicle 100 that provides electrical energy to components of the host vehicle 100. The high voltage power source 135 powers the critical loads 130 and the non-critical loads 125 under normal circumstances (e.g., when the critical loads 130 and high voltage power source 135 are working properly). The output of the high voltage power source 135 may be on the order of several hundred volts in some instances, such as when the high voltage power source 135 is used in an electric vehicle or a hybrid vehicle (i.e., a vehicle where propulsion can be powered by the high voltage power source 135, an internal combustion engine, or both). The output of the high voltage power source 135 may be in the form of direct current (DC).

Although illustrated as a sedan, the host vehicle 100 may include any passenger or commercial automobile such as a car, a truck, a sport utility vehicle, a crossover vehicle, a van, a minivan, a taxi, a bus, etc. As discussed above, the host vehicle 100 is an autonomous vehicle that can operate in an autonomous (e.g., driverless) mode (SAE levels 4-5), a partially autonomous mode (e.g., SAE levels 1-3), and/or a non-autonomous mode (e.g., SAE level 0).

Figure 2A:
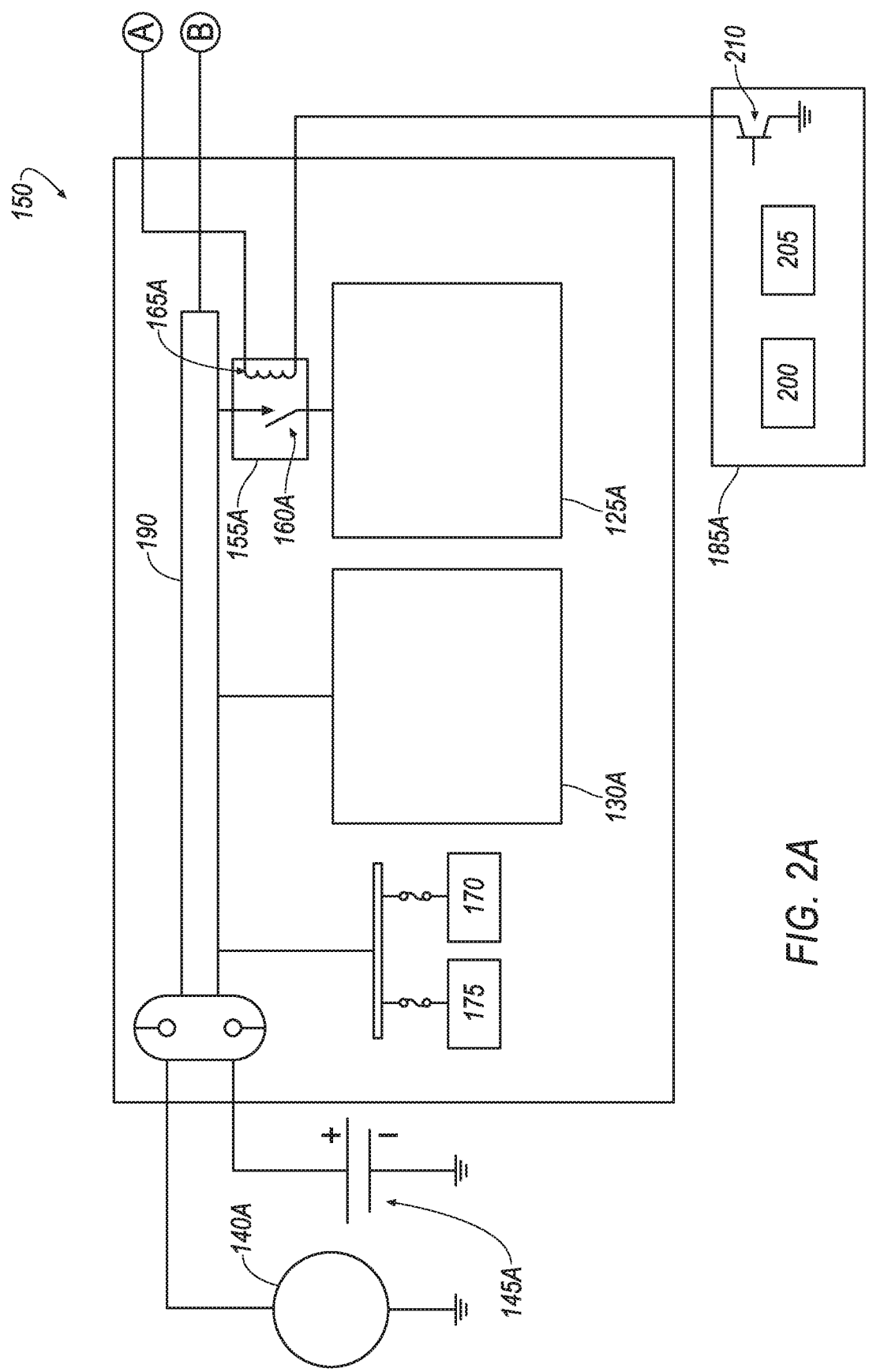
FIGS. 2A and 2B illustrate a circuit diagram with example components of the power management system.
Figure 2B:
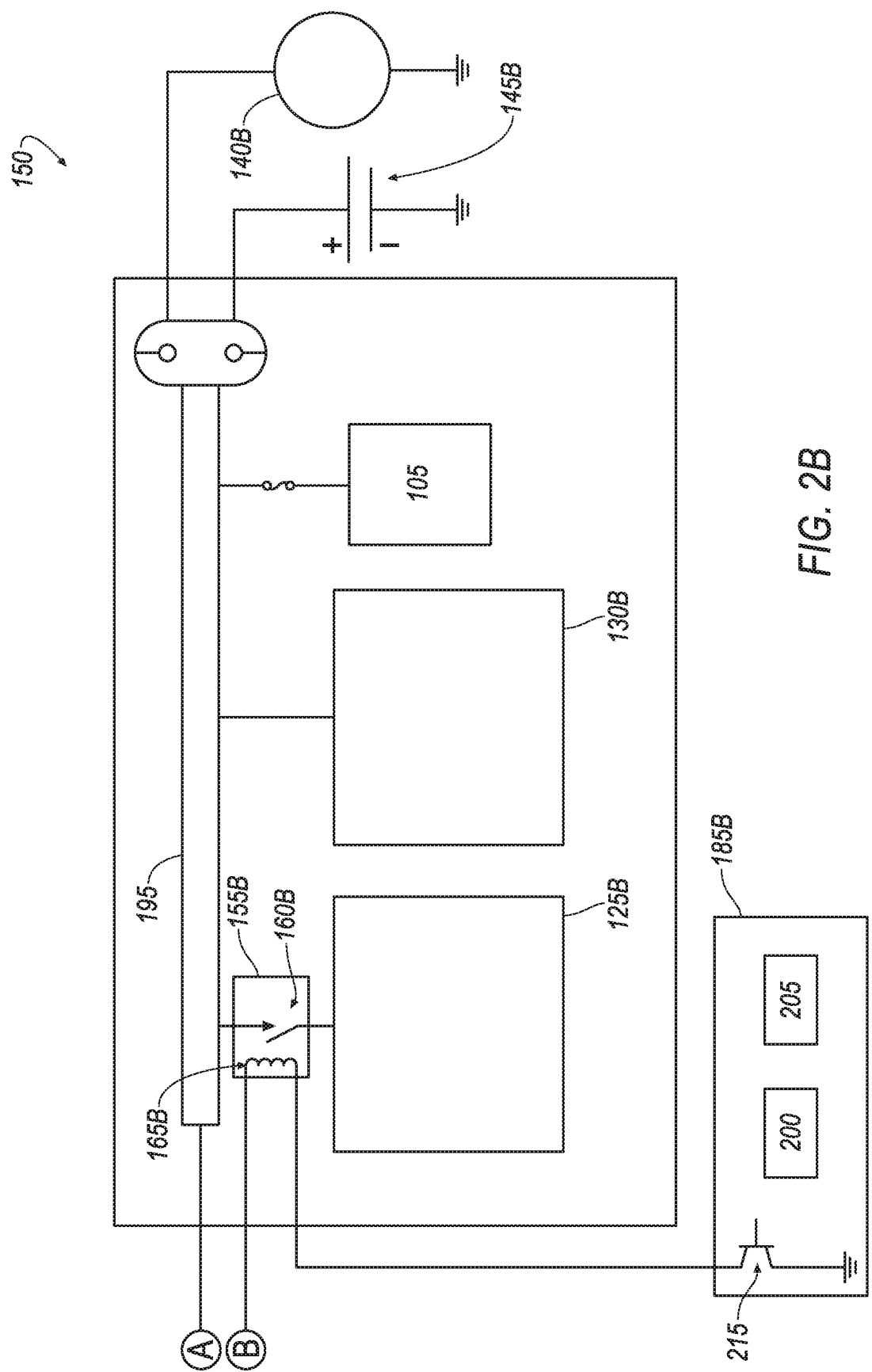

Referring now to FIGS. 2A and 2B (collectively referred to as "FIG. 2"), a circuit 150 implementing the power management system 115 may include voltage converters 140 such as a first voltage converter 140A and a second voltage converter 140B, power storage 145 including a first power storage 145A and a second power storage 145B, a first critical load 130A, a second critical load 130B, a first relay 155A, a second relay 155B, a battery controller 175, a powertrain controller 170, and an AVP interface controller 185.

The first voltage converter 140A and the second voltage converter 140B may be implemented via circuits, chips, or other electronic components that convert the output of the high voltage power source 135 to a different voltage. For instance, the first voltage converter 140A and the second voltage converter 140B may include circuits to reduce the DC output of the high voltage power source 135 to a lower DC output. Thus, the first voltage converter 140A and the second voltage converter 140B may be DC-to-DC converters. In one possible implementation, the output of the first voltage converter 140A and the output of the second voltage converter 140B may be on the order of 12 volts DC. The first voltage converter 140A and second voltage converter 140B may be electrically connected to the high voltage power source 135. The first voltage converter 140A and the second voltage converter 140B may be further electrically connected to various non-critical loads 125. For instance, the first voltage converter 140A may be electrically connected to a first non-critical load 125A via a primary power bus 190 and the second voltage converter 140B may be electrically connected to a second non-critical load 125B via a secondary power bus 195. The first non-critical load 125A and second non-critical load 125B may represent vehicle systems that draw electrical energy from the high voltage power source 135 but are not involved in the movement of the host vehicle 100 or passenger safety. Examples of non-critical loads 125 may refer to the infotainment system, climate controls, door lock actuators, power windows, liftgate actuators, an engine electric water pump, a fuel pump, a battery cooling fan, heated mirrors, heated back screen, among others. The first voltage converter 140A and second voltage converter 140B may be redundant to one another. In that instance, the first voltage converter 140A may provide power to the second non-critical load 125B should the second voltage converter 140B fail. Likewise, the second voltage converter 140B may provide power to the first non-critical load 125A should the first voltage converter 140A fail. Further, although the singular form is used for purposes of clarity and convenience, the "first non-critical load 125A" may refer to a first group of non-critical loads 125 and the "second non-critical load 125B" may refer to a second group of non-critical loads 125. One or more non-critical loads 125 in the first group of non-critical loads 125 may be the same as one or more non-critical loads 125 in the second group of non-critical loads 125. In other words, there may be some overlap between the groups of non-critical loads 125.

The first power storage 145A and second power storage 145B are batteries of the host vehicle 100 that power the critical loads 130. The output of the first power storage 145A and the second power storage 145B may be a DC voltage lower than that of the high voltage power source 135. For instance, the output of the first power storage 145A and the second power storage 145B may be on the order of 12 volts DC. The first power storage 145A may be electrically connected to the first critical load 130A and the first non-critical load 125A via the primary power bus 190. The second power storage 145B may be electrically connected to the second critical load 130B and the second non-critical load 125B via the second power bus. The critical loads 130 may refer to components of the host vehicle 100 that draw electrical energy and are involved in the movement of the host vehicle 100 or passenger safety. Examples of critical loads 130 may include actuators that control braking, steering, or acceleration of the host vehicle 100, actuators involved in the deployment of airbags and restraint devices, etc. The first power storage 145A and second power storage 145B may be redundant to one another. Thus, the first power storage 145A may provide power to the second critical load 130B should the second power storage 145B fail or be otherwise unavailable, as discussed below. Likewise, the second power storage 145B may provide power to the first critical load 130A should the first power storage 145A fail or be otherwise unavailable, as discussed below. Further, although the singular form is used for purposes of clarity and convenience, the "first critical load 130A" may refer to a first group of critical loads 130 and the "second critical load 130B" may refer to a second group of critical loads 130. One or more critical loads 130 in the first group of critical loads 130 may be the same as one or more critical loads 130 in the second group of critical loads 130. In other words, there may be some overlap between the groups of critical loads 130. Moreover, as shown in FIG. 2, the first power storage 145A is electrically connected to the first relay 155A via the primary power bus 190 and to the second relay 155B, also via the primary power bus 190. The second power storage 145B is electrically connected to the second relay 155B via the secondary power bus 195 and to the first relay 155A, also via the secondary power bus 195.

The first relay 155A and second relay 155B are each implemented via electronic components. In one possible approach, the first relay 155A includes a first inductor 165A arranged to activate or deactivate a first switch 160A. The first inductor 165A is electrically connected to the second voltage converter 140B and the second power storage 145B via the secondary power bus 195, and also to the AVP interface controller 185. The first switch 160A is arranged in series with the power output of the primary power bus 190 and the first non-critical load 125A. When the first switch 160A is closed, the power from the first voltage converter 140A, the first power storage 145A, or both, may power the first non-critical load 125A. When the first switch 160A is open, the first switch 160A will isolate the first non-critical load 125A from the primary power bus 190, thereby preventing the first non-critical load 125A from drawing power from the primary power bus 190. Because the first switch 160A is located between the primary power bus 190 and the first non-critical load 125A (and not between the primary power bus 190 and the first critical load 130A), opening the first switch 160A will still allow the first voltage converter 140A and first power storage 145A to power the first critical load 130A via the primary power bus 190. The first inductor 165A is arranged in series between the output of the secondary power bus 195 and the AVP interface controller 185. When current flows from the secondary power bus 195 to the first inductor 165A, the first inductor 165A will cause the first switch 160A to close. When current stops flowing from the secondary power bus 195, which could indicate a failure of the second voltage converter 140B, the second power storage 145B, or both, the lack of current through the first inductor 165A will cause the first switch 160A to open. Alternatively or in addition, as explained in greater detail below, the AVP interface controller 185 is programmed to output a signal under certain circumstances that prevents current flow through the first inductor 165A. Doing so may also cause the first switch 160A to open. Alternatively, the first relay 155A may be a solid-state relay implemented via, e.g., a field effect transistor (FET) arranged in the circuit 150 to allow current flow to the first non-critical load 125A in accordance with the output of the secondary power bus 195 and the AVP interface controller 185.

In one possible implementation, the second relay 155B includes a second inductor 165B arranged in parallel with a second switch 160B. The second inductor 165B is electrically connected to the second voltage converter 140B and the second power storage 145B via the secondary power bus 195, the first voltage converter 140A and the first power storage 145A via the primary power bus 190, and also to the AVP interface controller 185. The second switch 160B is arranged in series with the power output of the secondary power bus 195 and the second non-critical load 125B. When the second switch 160B is closed, the power from the second voltage converter 140B, the second power storage 145B, or both, may power the second non-critical load 125B. When the second switch 160B is open, the second switch 160B will isolate the second non-critical load 125B from the secondary power bus 195, thereby preventing the second non-critical load 125B from drawing power from the secondary power bus 195. Because the second switch 160B is located between the secondary power bus 195 and the second non-critical load 125B (and not between the secondary power bus 195 and the second critical load 130B), opening the second switch 160B will still allow the second voltage converter 140B and second power storage 145B to power the second critical load 130B via the secondary power bus 195. The second inductor 165B is arranged in series between the output of the primary power bus 190 and the AVP interface controller 185. When current flows from the primary power bus 190 to the second inductor 165B, the second inductor 165B will cause the second switch 160B to close. When current stops flowing from the primary power bus 190, which could indicate a failure of the first voltage converter 140A, the first power storage 145A, or both, the lack of current through the second inductor 165B will cause the second switch 160B to open. Alternatively or in addition, as explained in greater detail below, the AVP interface controller 185 is programmed to output a signal under certain circumstances that prevents current flow through the second inductor 165B. Doing so may also cause the second switch 160B to open. Alternatively, the second relay 155B may be a solid-state relay implemented via, e.g., a field effect transistor (FET) arranged to allow current flow to the second non-critical load 125B in accordance with the output of the primary power bus 190 and the AVP interface controller 185.

The battery controller 175 is implemented via circuits, chips, or other electronic components that control various operations of the high voltage power source 135, the first power storage 145A, the second power storage 145B, the first voltage converter 140A, the second voltage converter 140B, and possibly other components of the power management system 115. The powertrain controller 170 is implemented via circuits, chips, or other electronic components that control various powertrain components of the host vehicle 100. The engine controller is implemented via circuits, chips, or other electronic components that control the internal combustion engine of the host vehicle 100.

The AVP interface controller 185 is implemented via circuits, chips, or other electronic components that control various components of the host vehicle 100 that carry out autonomous vehicle operations. The AVP interface controller 185 may be programmed to interface with the virtual driver system 105, the components of the autonomous vehicle platform, etc. The AVP interface controller 185 may include a memory 200 and a processor 205 programmed to execute instructions stored in the memory 200. For instance, the processor 205 may allow the AVP interface controller 185 to disconnect the first critical load 130A from the primary power bus 190, the second critical load 130B from the secondary power bus 195, etc., by controlling the current flow through the first relay 155A, the second relay 155B, or both. That is, the AVP interface controller 185 may include, e.g., a first transistor 210, electrically connected in series with the first inductor 165A, that prevents current flow through the first inductor 165A. The AVP interface controller 185 may further include a second transistor 215, electrically connected in series with the second inductor 165B, that prevents current flow through the second inductor 165B, etc. As explained above, preventing current flow through the first inductor 165A will cause the first switch 160A to open, thereby preventing the first non-critical load 125A from receiving power through the primary power bus 190. Preventing current flow through the second inductor 165B will cause the second switch 160B to open, thereby preventing the second non-critical load 125B from receiving power through the secondary power bus 195. The operation of the first transistor 210 and second transistor 215 may be controlled by the processor 205, as explained in greater detail below. Moreover, the AVP interface controller 185 of FIG. 2 is shown as separate blocks because the AVP interface controller 185 of FIG. 2 is implemented via multiple controllers, one for each powernet. In that instance, each AVP interface controller 185 may include its own memory 200 and processor 205.

The memory 200 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 200 may store instructions executable by the processor 205 and data. The instructions and data stored in the memory 200 may be accessible to the processor 205 and possibly other components of the power management system 115, the host vehicle 100, or both.

The processor 205 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 205 is programmed to output signals to the first transistor 210, the second transistor 215, or both, that cause the first transistor 210 and second transistor 215 to prevent current flow through the first inductor 165A and second inductor 165B, respectively. For example, during startup of the host vehicle 100, the processor 205 may be programmed to output a signal to the first transistor 210, the second transistor 215, or both, that cause the first relay 155A, second relay 155B, or both, respectively, to prevent current flow to the non-critical loads 125. That is, the processor 205 outputting the signal to the first transistor 210 may cause the first switch 160A to open. The processor 205 outputting the signal to the second transistor 215 may cause the second switch 160B to open. The processor 205 may continue to output the signals to the first transistor 210, the second transistor 215, or both, until the processor 205 receives a signal from, e.g., the battery controller 175 confirming that the first power storage 145A, the second power storage 145B, and the high voltage power source 135 are operating properly. Once the processor 205 confirms that the first power storage 145A, the second power storage 145B, and the high voltage power source 135 are operating properly, the processor 205 may allow the first relay 155A, the second relay 155B, or both, to close. Closing the first relay 155A may include the processor 205 outputting a signal to the first transistor 210 (or removing a signal from, e.g., the gate of the first transistor 210) so current may flow through the first inductor 165A. As explained above, current flow through the first inductor 165A may cause the first switch 160A to close. Closing the second relay 155B may include the processor 205 outputting a signal to the second transistor 215 (or removing a signal from, e.g., the gate of the second transistor 215) so current may flow through the second inductor 165B. As explained above, current flow through the second inductor 165B may cause the second switch 160B to close.

In some instances, the processor 205 may be programmed to control the states of the first switch 160A and the second switch 160B independently of the outputs of the secondary power bus 195 and primary power bus 190, respectively. That is, even if the first voltage converter 140A, the first power storage 145A, the second voltage converter 140B, the second power storage 145B, and the high voltage power source 135 are all working properly, the processor 205 may be programmed to open the first relay 155A, the second relay 155B, or both. For example, the processor 205 may be programmed to open the first relay 155A and the second relay 155B as a result of detecting a vehicle startup, as explained in greater detail below. Opening the first relay 155A and the second relay 155B during vehicle startup may reduce the risk of transient power issues caused by starting up the host vehicle 100.

Further, although shown as part of the AVP interface controller 185, the memory 200, processor 205, or both, may be incorporated into other electronic vehicle controllers such as the battery controller 175.

Figure 3:
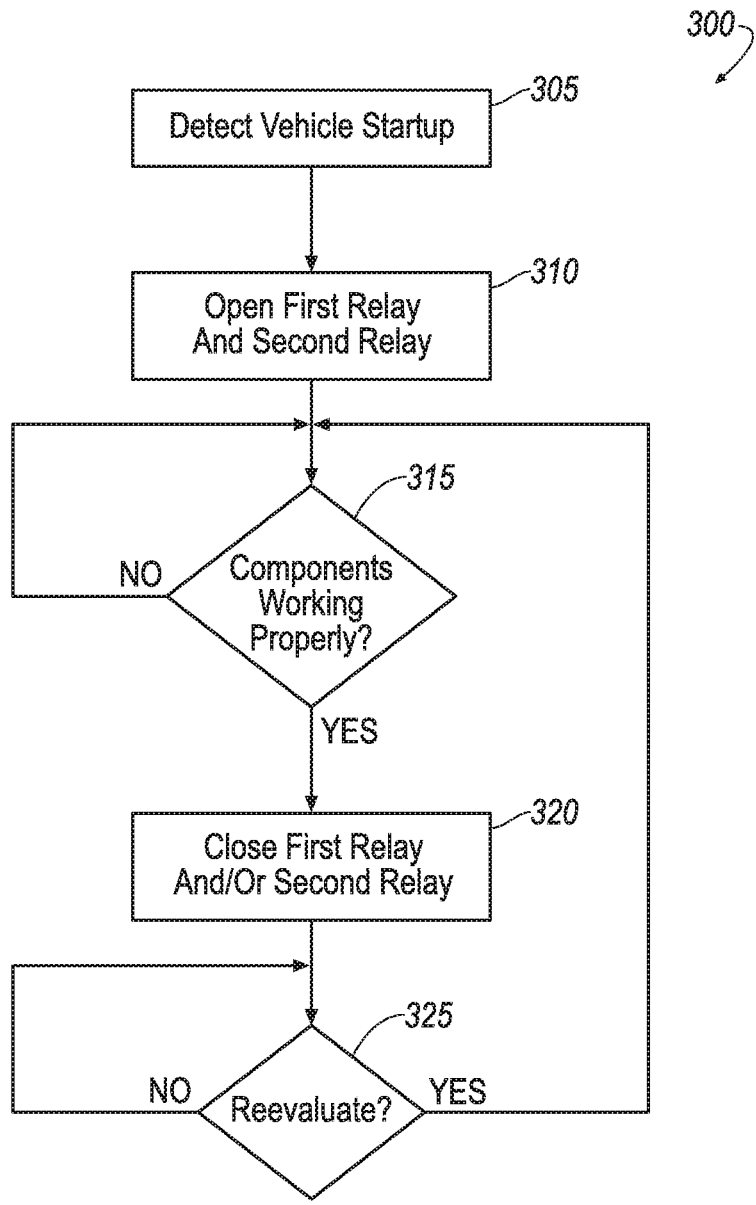
FIG. 3 is a flowchart of an example process that may be executed by the power management system.

FIG. 3 is a flowchart of an example process 300 that may be implemented by one or more components of the power management system 115. The process 300 may begin prior to startup of the host vehicle 100 300 and may continue until, e.g., the processor 205 confirms that the first power storage 145A, the second power storage 145B, and the high voltage power source 135 are operating properly.

At block 305, the power management system 115 detects startup of the host vehicle 100. For example, the processor 205 may detect that the host vehicle 100 has been started. Starting the host vehicle 100 may include the host vehicle 100 switching from an OFF state to an ACC or RUN state.

At block 310, the power management system 115 opens the first relay 155A and the second relay 155B. To open the first relay 155A, the processor 205 is programmed to output a signal to the first transistor 210 that causes current to stop flowing from the secondary power bus 195 to the first relay 155A. By eliminating that current flow, the first switch 160A opens to disconnect the first non-critical load 125A from the primary power bus 190. To open the second relay 155B, the processor 205 is programmed to output a signal to the second transistor 215 that causes current to stop flowing from the primary power bus 190 to the second relay 155B. By eliminating that current flow, the second switch 160B opens to disconnect the second non-critical load 125B from the secondary power bus 195.

At decision block 315, the power management system 115 determines whether the high voltage power source 135, the first voltage converter 140A, the second voltage converter 140B, the first power storage 145A, and the second power storage 145B are working properly. The processor 205, for example, may be programmed to determine that the high voltage power source 135, the first voltage converter 140A, the second voltage converter 140B, the first power storage 145A, and the second power storage 145B are working properly based on signals output by the battery controller 175, which may be programmed to determine the state of the high voltage power source 135, the first voltage converter 140A, the second voltage converter 140B, the first power storage 145A, and the second power storage 145B during startup or shortly thereafter. If the processor 205 determines that the high voltage power source 135, the first voltage converter 140A, the second voltage converter 140B, the first power storage 145A, and the second power storage 145B are working properly, the process 300 may proceed to block 320. Otherwise, decision block 315 may be repeated until the battery controller 175 confirms that the high voltage power source 135, the first power storage 145A, and the second power storage 145B are working properly. Decision block 315 may be repeated only a predetermined number of iterations, with a predetermined delay between each iteration. If the predetermined number of iterations is reached, the processor 205 may be programmed to output a fault code and the process 300 may end.

At block 320, the power management system 115 may close the first relay 155A, the second relay 155B, or both. To close the first relay 155A, the processor 205 may be programmed to remove or adjust the signal output to the first transistor 210. Removing or adjusting the signal to the first transistor 210 may cause the first transistor 210 to allow current to flow from the secondary power bus 195 through the first relay 155A. Current flow through the first relay 155A causes the first switch 160A to close, thereby electrically connecting the first non-critical load 125A to the primary power bus 190. To close the second relay 155B, the processor 205 may be programmed to remove or adjust the signal output to the second transistor 215. Removing or adjusting the signal to the second transistor 215 may cause the second transistor 215 to allow current to flow from the primary power bus 190 through the second relay 155B. Current flow through the second relay 155B causes the second switch 160B to close, thereby electrically connecting the second non-critical load 125B to the secondary power bus 195.

At decision block 325, the power management system 115 determines whether to reevaluate the status of the high voltage power source 135, the first voltage converter 140A, the second voltage converter 140B, the first power storage 145A, and the second power storage 145B. The processor 205 may be programmed to periodically reevaluate the status of the high voltage power source 135, the first voltage converter 140A, the second voltage converter 140B, the first power storage 145A, and the second power storage 145B. If the processor 205 determines that the status of the high voltage power source 135, the first voltage converter 140A, the second voltage converter 140B, the first power storage 145A, and the second power storage 145B should be reevaluated, the process 300 may return to block 315. Otherwise, the process 300 may either end or continue to repeat block 325.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A vehicle power management system comprising:
   a primary power bus for powering a first non-critical load;
   a secondary power bus for powering a second non-critical load;
   a first relay including a first switch and a first inductor, the first switch electrically connected between the primary power bus and the first non-critical load, the first inductor arranged to activate the first switch; and
   a second relay including a second switch and a second inductor, the second switch electrically connected between the secondary power bus and the second non-critical load, the second inductor arranged to activate the second switch,
   wherein the first inductor is electrically connected in series with the secondary power bus and the second inductor is electrically connected in series with the primary power bus.

2. The vehicle power management system of claim 1, further comprising a first voltage converter electrically connected to the primary power bus.

3. The vehicle power management system of claim 2, further comprising a second voltage converter electrically connected to the secondary power bus.

4. The vehicle power management system of claim 1, further comprising a first power storage electrically connected to the primary power bus.

5. The vehicle power management system of claim 4, further comprising a second power storage electrically connected to the secondary power bus.

6. The vehicle power management system of claim 1, further comprising a processor, and wherein the processor is programmed to control a state of the first switch and a state of the second switch.

7. The vehicle power management system of claim 6, wherein the processor is programmed to control the state of the first switch by outputting a signal to a first transistor electrically connected in series with the first inductor to control current flow through the first inductor.

8. The vehicle power management system of claim 7, wherein the processor is programmed to control the state of the second switch by outputting a signal to a second transistor electrically connected in series with the second inductor to control current flow through the second inductor.

9. The vehicle power management system of claim 6, wherein the processor is programmed to:
   detect a vehicle startup; and
   open the first relay and the second relay as a result of detecting the vehicle startup.

10. The vehicle power management system of claim 9, wherein opening the first relay includes outputting a signal to a first transistor in series with the first inductor to open the first switch.

11. The vehicle power management system of claim 10, wherein opening the second relay includes outputting a signal to a second transistor in series with the second inductor to open the second switch.

12. The vehicle power management system of claim 11, wherein the processor is programmed to detect that at least one of a high voltage power source, a first voltage converter, a second voltage converter, a first power storage, and a second power storage is working properly.

13. The vehicle power management system of claim 12, wherein the processor is programmed to detect that at least one of the high voltage power source, the first voltage converter, the second voltage converter, the first power storage, and the second power storage is working properly based at least in part on a signal output by a battery controller.

14. The vehicle power management system of claim 12, wherein the processor is programmed to close the first relay and the second relay as a result of detecting that the high voltage power source, the first voltage converter, the second voltage converter, the first power storage, and the second power storage are working properly.

15. A vehicle power management system comprising:
   a primary power bus for powering a first non-critical load;
   a secondary power bus for powering a second non-critical load;
   a first voltage converter electrically connected to the primary power bus;
   a second voltage converter electrically connected to the secondary power bus;
   a first power storage electrically connected to the primary power bus;
   a second power storage electrically connected to the secondary power bus;
   a first relay including a first switch and a first inductor, the first switch electrically connected between the primary power bus and the first non-critical load, the first inductor arranged to activate the first switch;
   a second relay including a second switch and a second inductor, the second switch electrically connected between the secondary power bus and the second non-critical load, the second inductor arranged to activate the second switch; and
   a processor programmed to control a state of the first switch and a state of the second switch,
   wherein the first inductor is electrically connected in series with the secondary power bus and the second inductor is electrically connected in series with the primary power bus.

16. The vehicle power management system of claim 15, wherein the processor is programmed to control the state of the first switch by outputting a signal to a first transistor electrically connected in series with the first inductor to prevent current flow through the first inductor.

17. The vehicle power management system of claim 16, wherein the processor is programmed to control the state of the second switch by outputting a signal to a second transistor electrically connected in series with the second inductor to prevent current flow through the second inductor.

18. The vehicle power management system of claim 15, wherein the processor is programmed to:
detect a vehicle startup; and
open the first relay and the second relay as a result of detecting the vehicle startup.

19. The vehicle power management system of claim 18, wherein opening the first relay includes outputting a signal to a first transistor in series with the first inductor to open the first switch and wherein opening the second relay includes outputting a signal to a second transistor in series with the second inductor to open the second switch.

20. The vehicle power management system of claim 19, wherein the processor is programmed to:
detect that at least one of a high voltage power source, a first voltage converter, a second voltage converter, a first power storage, and a second power storage is working properly based at least in part on a signal output by a battery controller; and
close the first relay and the second relay as a result of detecting that the high voltage power source, the first voltage converter, the second voltage converter, the first power storage, and the second power storage are working properly.

* * * * *